United States Patent

Huber et al.

[11] Patent Number: 6,073,988
[45] Date of Patent: Jun. 13, 2000

[54] COLLAPSIBLE HARD TOP FOR A CONVERTIBLE

[75] Inventors: Helmut Huber, Niederalteich; Karl Kressel, Lichtenfels, both of Germany

[73] Assignee: Edscha Cabrio-Verdecksysteme GmbH & Co., Hengersberg, Germany

[21] Appl. No.: 09/139,700

[22] Filed: Aug. 25, 1998

[30] Foreign Application Priority Data

Aug. 26, 1997 [DE] Germany .......................... 197 37 057

[51] Int. Cl.$^7$ ....................................................... B60J 7/08
[52] U.S. Cl. ................. 296/116; 296/107.07; 296/107.2; 296/216.04
[58] Field of Search .................... 296/107.07, 107.19, 296/107.2, 145.14, 145.16, 185, 186, 124, 116, 216.04

[56] References Cited

U.S. PATENT DOCUMENTS

| 2,785,922 | 3/1957 | Chika ............................. 296/107.07 X |
| 2,841,441 | 7/1958 | Evans ...................................... 296/117 |
| 3,021,174 | 2/1962 | Rund ..................................... 296/107.2 |
| 3,271,167 | 9/1966 | Rollman ................................... 296/116 |
| 3,567,209 | 3/1971 | Lathers ................................. 296/106 X |
| 5,769,483 | 6/1998 | Danzl et al. ......................... 296/221 X |

FOREIGN PATENT DOCUMENTS

| 953229 | 11/1956 | Germany ............................. 296/107.2 |
| 4025936 | 3/1991 | Germany . | |

*Primary Examiner*—Dennis H. Pedder
*Attorney, Agent, or Firm*—Brown & Wood, LLP

[57] ABSTRACT

A collapsible hard top for a convertible including a top panel, two side longitudinal top carriers, two rear posts adjoining the two side top carriers from behind, respectively, a top element including a rear window of the convertible and displaceable relative to the top panel, and support and guide rails forming a displacement guide for displacing the top element, together with the rear top posts, with the support and guide rails being arranged in drop-down position relative to a rear panel of the convertible and within a trunk, and with the top panel being formed of at least two longitudinal sections at least one of which is supported for displacement in a longitudinal direction of the convertible on the two side carriers.

4 Claims, 4 Drawing Sheets

COLLAPSIBLE HARD TOP FOR A CONVERTIBLE

BACKGROUND OF THE INVENTION

1. Field of the Invention

The present invention relates to a collapsible hard top for convertible and including a top panel, two side longitudinal top carriers, two rear top posts adjoining the two side top carriers from behind, respectively, a top element including a rear window of the convertible and displaceable relative to the top panel, and support and guide rails forming a displacement guide for displacing the top element, together with the rear top posts, forward and located inside a trunk, with the support and guide rails being arranged in a drop-down position relative to a rear panel of the convertible.

2. Description of the Prior Art

In conventional, presently in high demand, convertibles with hard tops, the top, when being displaced from a closed position to an open position, is displaced along its entire length, together with the top posts, in a top receiving space, in particular into a trunk of a saloon limo or sedan, with the posts being displaceable along the side displacement guides provided on side panels of the vehicle body.

German publication DE-OS 4025936 discloses a collapsible vehicle top displaceable, together with the top posts and the rear window, from its use position into a trunk provided in the rear region of the vehicle. To reduce the space for storing the top, i.e., to insure a compact storage of the top, in this top, means is provided for folding the rear window into a region beneath the rear portion of the top, i.e., beneath a rear region of the top panel. To this end, the rear window pivots about an axle provided beneath end regions of the top posts. The disclosed top is provided with the posts which extend almost at a right angle to the top plane. When this top is displaced into a receiving space, which extends in a transverse direction with respect to a longitudinal extent of the vehicle, much space is required in the edge regions of the side panels to accommodate the sidewise projecting top posts, which space is hardly available in compact vehicles. If the top posts were arranged at an obtuse angle with respect to the top panel to insure that less space is required, a comparative pivotal arrangement of the rear window on the posts would not be possible.

Accordingly, an object of the present invention is to provide a collapsible hard top for convertible, in particular four-seat convertible, which, on one hand, has an excellent stiffness and, on the other hand, does not adversely affect the access to the trunk space while being stored in the trunk. That is, the inventive collapsible hard top should have a particularly stiff construction and be capable of being stored. in its collapsible condition within the vehicle body without adversely affecting the functions of the vehicle inner space so that both the vehicle inner space and the trunk space retain their functions to a greatest possible extent.

SUMMARY OF THE INVENTION

These and other objects of the present invention, which will become apparent hereinafter, are achieved by forming the top panel of at least two longitudinal sections with at least one of the sections being supported for longitudinal displacement in the longitudinal direction of the vehicle on the side top carriers of the hard top, with the top posts formed integrally with the side top carriers, respectively, and with a longitudinal section of the top panel being rigidly connected with the top carriers and top posts, the top has a substantially H-shape which provides a very stable top frame which is further reinforced by guide rails which are provided for displaceably supporting the top panel parts and/or the rear window.

According to the invention, it is further provided that the rear window, which is generally adjustable in per se known manner, is additionally displaceable in a longitudinal direction of the vehicle relative to one of the longitudinal sections of the top panel along the two top carriers and adjoining them top posts. The rear window is displaceable simultaneously with the front section of the top panel, with the front section being displaceable backward beneath the stationary rear section of the top panel and the rear window being displaceable forward and upward also beneath the rear section of the top panel. Thereby, in the collapsible condition of the top, the length of the top panel, together with the rear window, is reduced to the length of the rigid section of the top panel which interconnects the two side top carriers. This insures, in the collapsible condition of the top, access to the trunk space through the free space between the two top posts obtained as a result of displacement of the rear window forward beneath the rear section of the top panel. Further, the displacement of the front section of the top panel backward beneath the rear panel reduces the storage space within the trunk because both front sections of both side top carriers can be received in cavities formed in side panels on opposite sides of the rear seat bench. Thereby, the collapsing hard top not adversely influences seating comfort of the vehicle rear seats.

According to an advantageous embodiment of the present invention, the displacement guides, in particular the support and guide rails for the top posts have a curvature corresponding to the top panel bow and are secured in drop-down position on the vehicle rear panel inside the trunk in the area of the vehicle side panels. Such attachment of the displaceable top support to the vehicle body insures, in an advantageous manner, selection of the length of the rigid section of the top, which interconnects the opposite side top carriers and adjoining them from behind, top posts, such that it corresponds at least to the top luggage rack, and insures that in the open position of the top, the rigid section overlaps the region between the front edge of the trunk lid and the backrest of the vehicle rear seat bench.

Further, the inventive construction of the hard top, on one hand, and of the displaceable top support insures that in the collapsible condition of the top, the rigid rear section of the top forms a cover for the luggage rack, and insures, on the other hand, that a small clearance space between the vehicle rear cross-bar, on which the luggage rack is supported, and the trunk lid is necessary for displacing the top into the trunk. The trunk lid can be secured to the luggage rack-supporting cross-bar in a conventional manner with two U-shaped hinge levers.

According to a further development of the present invention, the side panels of the vehicle body have, in the region of the real seat bench, a thickness corresponding to the width of the side top carriers. Upwardly open troughs for receiving the front section of the side top carriers are formed in the side panels in the region of the rear seat bench. Advantageously, pivotal or sliding covers can be provided which in the closed position of the top, cover the troughs and form simultaneously arm rests.

According to one of the preferable embodiments of the present invention, the front section of the top panel is supported for displacement in a manner conventional for sliding tops between an elevated or lifted closed position and a sunk displacement position. The front section is supported on and is displaced along support and guide rails provided on the two side top carriers. The front section is driven, preferably, by a thread cable drive. This permits to use the front section of the top panel as a sliding roof in the closed position of the top. In addition to the use of the front section of the top panel as a sliding roof, it can be further provided for lifting of the rear end of the front section upon its displacement from the closed position, i.e., the front section can be displaced in a ventilating position.

According to a still further development of the present invention, an advantageous construction of the hard top is provided by using a cassette in which the front displaceable section of the top panel is received and which engages the rear rigid section of the top panel from beneath. Advantageously, the rear window, which moves forward and upward upon displacement of the top in the top open position, is likewise received in the cassette. Thus, the use of a cassette, which engages the rear stationary section of the top panel from beneath and which is capable of receiving both the front section of the top panel and the rear window during collapsing of the hard top, permits to substantially reduce the overall dimensions of top in the collapsible condition of the top. Preferably, a thread cable drive is also used for driving the rear window in its stored position into the cassette.

BRIEF DESCRIPTION OF THE DRAWINGS

The features and objects of the present invention will become more apparent, and the invention itself will be best understood from the following detailed description of the preferred embodiment when read with reference to the accompanying drawings, wherein.

DETAILED DESCRIPTION OF THE PREFERRED EMBODIMENTS

Figure 1:
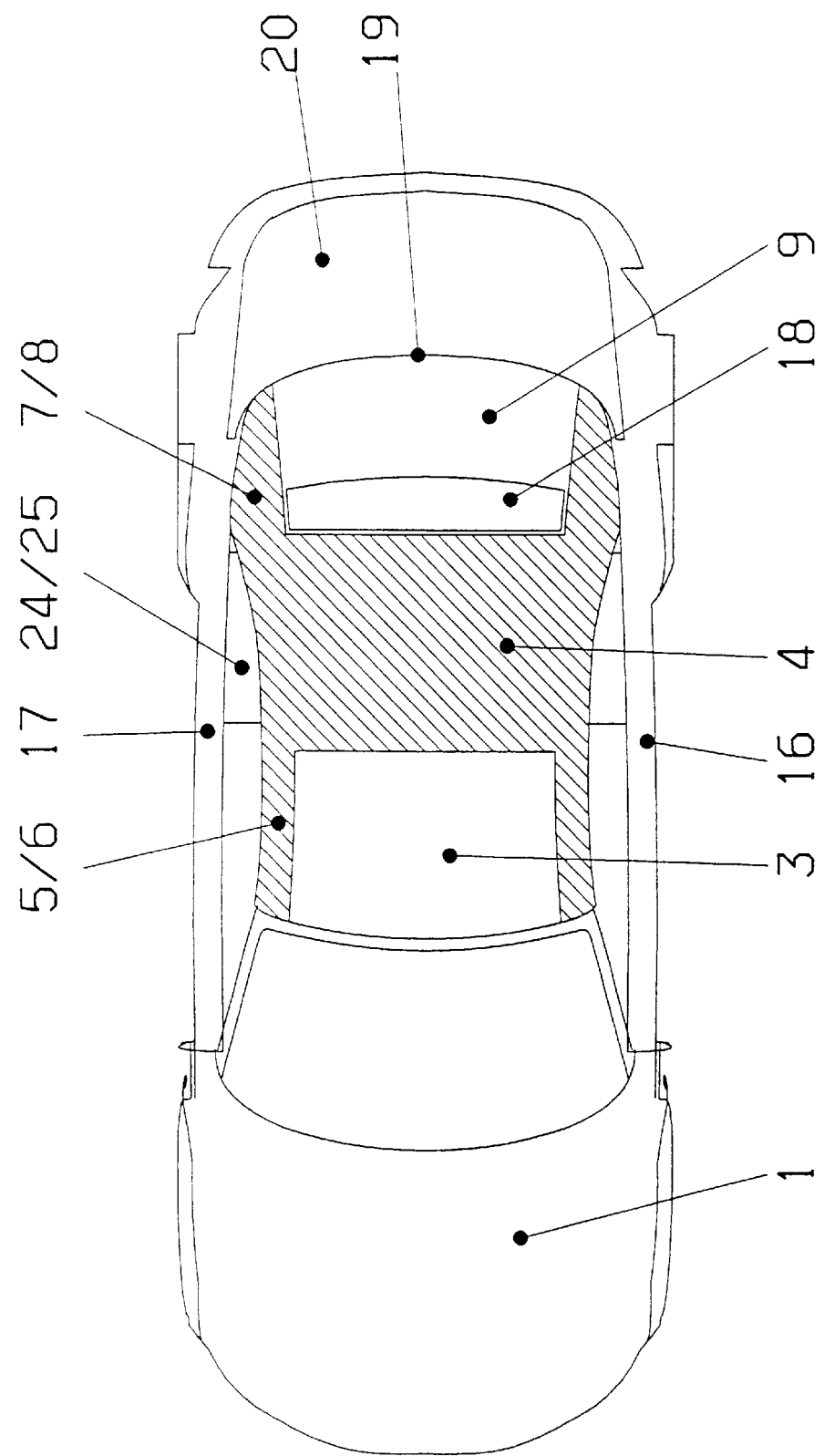
FIG. 1 shows a schematic view illustrating a collapsible hard top according to the present invention in a closed position.
Figure 2:
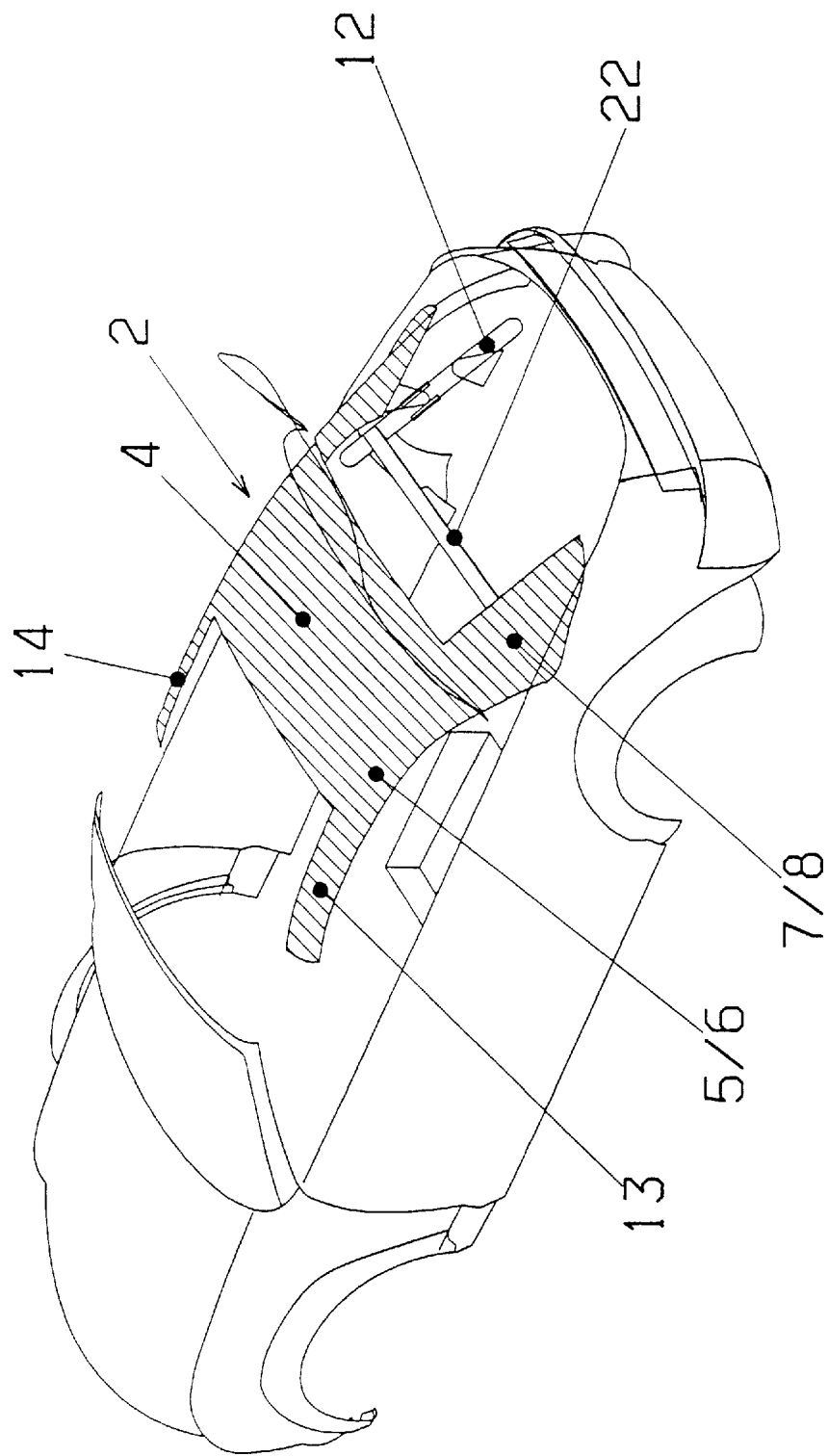
FIG. 2 shows a schematic view illustrating a collapsible hard top according to the present invention in a partially open position.
Figure 3:
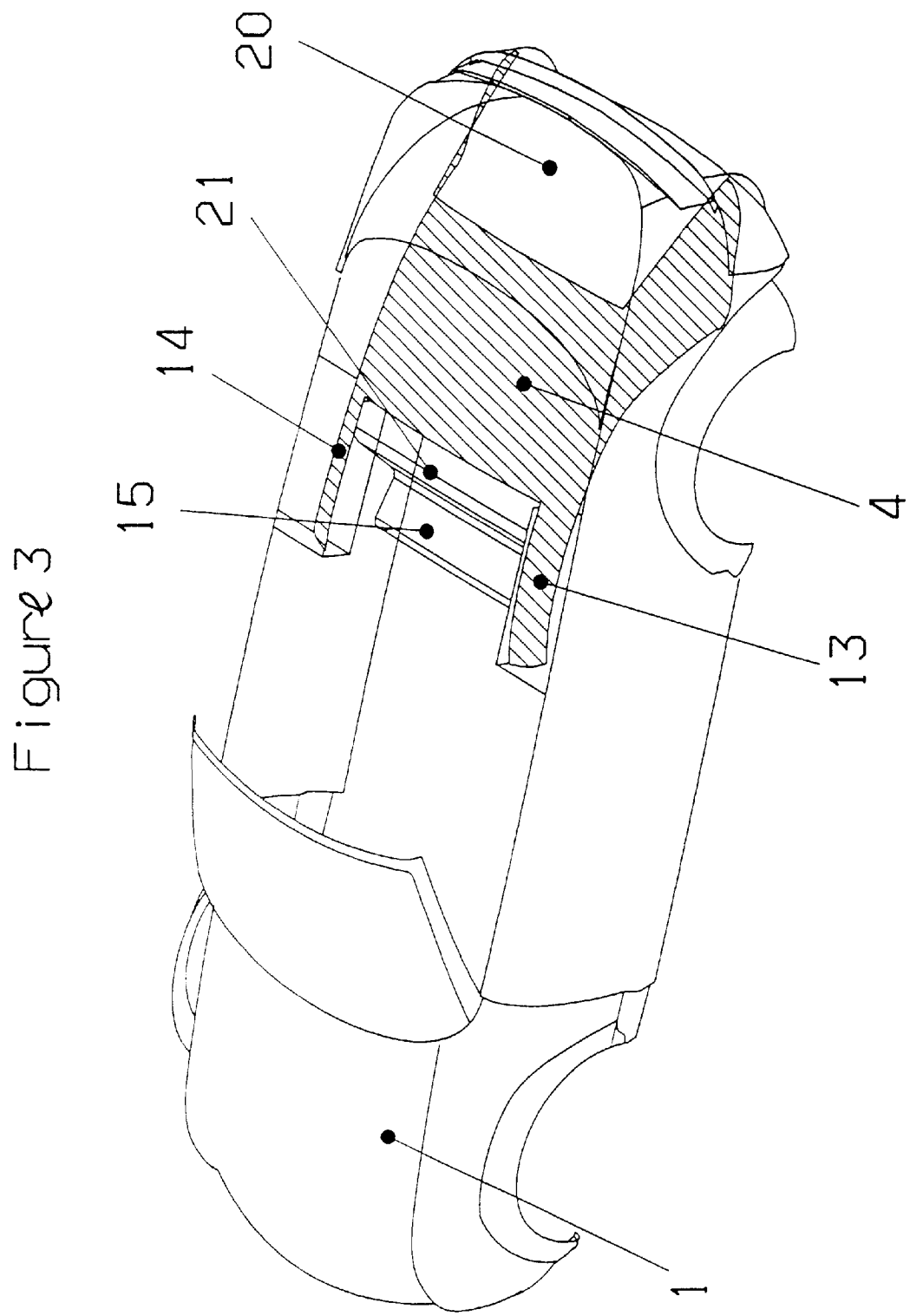
FIG. 3 shows a schematic view illustrating a collapsible hard top according to the present invention in an open position.

FIGS. 1 through 4 show schematically a four-seat convertible 1 provided with a collapsible hard top 2 according to the present invention. The hard top 2 according to the present invention is formed essentially of a top panel divided in two longitudinal sections 3 and 4, two rear top posts 7, 8 forming an extension of respective side top carriers 5, 6. A rear window 9 of the vehicle, which forms part of the hard top, can be adjusted relative to the top panel. The hard top 1, in its entirety, together with the top posts 7, 8, is displaceable into a top receiving space provided in the rear region of the vehicle, in particular in a trunk 10. The hard top 2 is supported on and is displaced along support and guide rails 12 which are arranged, with respect to a vehicle rear panel 11, in a drop-down position. The support and guide rails 12, which form a displacement guide, are curved in accordance with the bow of the top profile. The front section 3 of the two longitudinal sections 3, 4 of the top panel is supported on and is displaceable, in a longitudinal direction of the vehicle, along the side top carriers 5, 6 by appropriate sliding blocks (not shown) which displace on respective guide rails (likewise not shown). The front section 3 is supported on is displaced along the side top carriers 5, 6 in such a manner that it is displaced between its front, aligned with the top plane, closed position and its sunk, with respect to the top plane, open position beneath the rigid rear section 4 of the top panel. The rear window 9 is likewise supported on and is displaced along the two side longitudinal top carriers 5, 6, in particular the rear top posts 7 and 8 which adjoin the side top carriers 5, 6. The rear window 9 is supported for displacement along the top posts 7, 8 by appropriate slide blocks (not shown) displaceable along respective guide rails (also not shown). The rear window 9 is so displaced that with the front section 3 of the top panel displacing backward under the stationary rear section 4, the rear window 9 is displaced forward also beneath the rigid rear section 4. The position in which the front section 3 of the top panel is displaced backward and the rear window 9 is displaced forward, is shown in FIG. 3. In this collapsible position of the hard top 2, both front longitudinal sections 13 and 14 of the two side top carriers 5, 6 are located on opposite sides of a rear seat bench 15, abutting the side panels 16 and 17 of the vehicle body, without any reduction in the seating comfort of passengers. The rigid longitudinal rear section 4, which interconnects the side top carriers 5, 6 and adjoining them from behind, top posts 7, 8, has a length which at least corresponds to the width of the luggage rack 18 of the motor vehicle, and in the open position of the hard top 2, overlaps the space between the front edge 19 of the trunk lid 20 and the backrest 21 of the rear seat bench 15 of the passenger compartment. At the same time, the rigid rear section 4 of the top panel forms a cover for the luggage rack 18 in the collapsible position of the hard top 2. Because for displacing the top 2 into the trunk 10 a relatively small clearance space between rear element which supports the luggage rack 18, and the truck lid 20 is required, the trunk lid 20 is secured to the rear cross-bar 22 of the motor vehicle body, in a conventional manner, with two U-shaped hinge levers 23.

Figure 4:
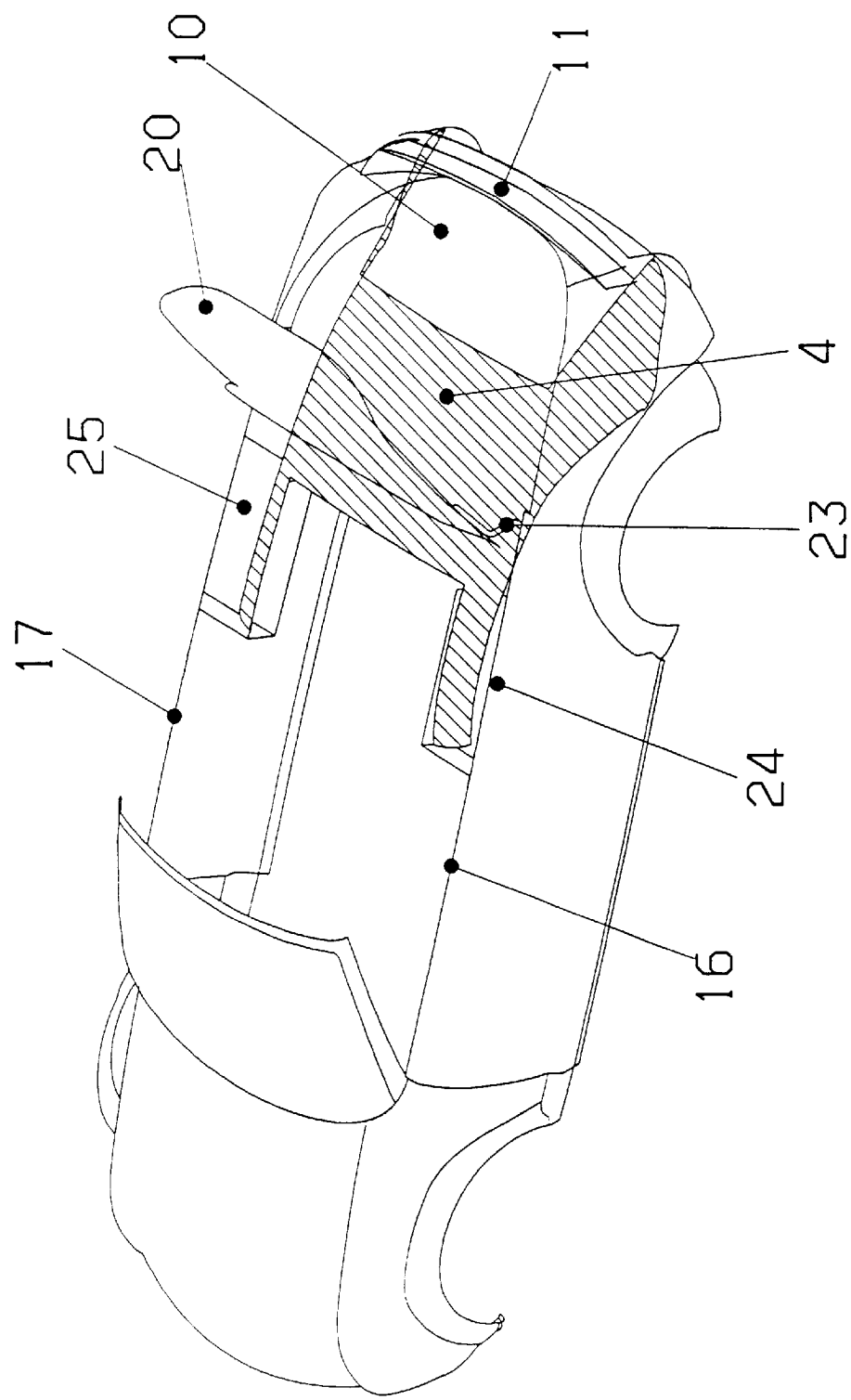
FIG. 4 shows a schematic view illustrating a collapsible hard top according to the present invention in its stored position.

The side panels 16 and 17 of the motor vehicle body have, in the region of the rear seat bench 15 of the vehicle, a width corresponding to a width of the front longitudinal sections 13 and 14 of the side top carriers 5 and 6 and are provided with respective, opening upward, receiving trough 24 and 25 for the front longitudinal sections 13 and 14. For covering the receiving through 24 and 25 in the closed position of the hard top 2, pivotal or sliding covers (not shown) are provided. The covers form arm rests. As shown in FIG. 4, in the collapsible condition of the hard top 2, the access to the trunk interior is provided through the free space between the two top posts 7 and 8 which is obtained as a result of the displacement of the rear window forward, under the rigid rear section 4 of the hard top panel.

Though the present invention was shown and described with reference to the preferred embodiment, various modifications thereof will be apparent to those skilled in the art and, therefore, it is not intended that the invention be limited to the disclosed embodiments or details thereof, and departure can be made therefrom within the spirit and scope of the appended claims.

What is claimed is:

1. A collapsible hard top for a convertible, comprising:

A top panel;

two side longitudinal top carriers;

two rear top posts adjoining the two side top carriers from behind, respectively;

support and guide rails forming displacement guide means for displacing the top panel, together with the real top posts, in a longitudinal direction of the convertible and relative to a rear window of the convertible, the support and guide rails being arranged in drop-down position relative to a rear panel of the convertible and located inside a trunk of the convertible, wherein the top panel is formed of at least two longitudinal sections at least one of which is supported for displacement in a longitudinal direction of the convertible on the side top carriers, and wherein the two side top carriers and the top posts adjoining the respective side top carriers are interconnected by a rigid section of the top panel having a length corresponding at least to a width of a luggage rack of the convertible, and wherein the rigid section of the top panel overlaps, in an open position of the hard top, a region between a front edge of a trunk lid and a backrest of a rear seat bench.

2. A collapsible hard top for a convertible, comprising:

A top panel;

two side longitudinal top carriers;

two rear top posts adjoining the two side top carriers from behind, respectively;

support and guide rails forming displacement guide means for displacing the top panel, together with the real top posts, in a longitudinal direction of the convertible and relative to a rear window of the convertible, the support and guide rails being arranged in drop-down position relative to a rear panel of the convertible and located inside a trunk of the convertible, wherein the top panel is formed of at least two longitudinal sections at least one of which is supported for displacement in a longitudinal direction of the convertible on the side top carriers, and wherein the side top carriers are received in upwardly open troughs formed in side panels of a convertible body in a region of a rear seat bench of the convertible and having a width corresponding to a width of the side top carriers.

3. A collapsible hard top as set forth in claim 2, wherein the at least two longitudinal sections of the top panel are formed as front and rear sections, and wherein the front section is displaced, upon collapsing of the hard top, beneath the rear section backward and the rear window is displaced beneath the rear section forward.

4. A collapsible hard top as set forth in claim 2, wherein the trunk lid beneath, which the support and guide rails are located, is secured to a cross-bar of a body of the convertible, which is arranged in a region of a top luggage rack, with two U-shaped hinge levers.

* * * * *